US007899975B2

(12) United States Patent
Driehorn et al.

(10) Patent No.: US 7,899,975 B2
(45) Date of Patent: Mar. 1, 2011

(54) METHOD FOR STORING INDIVIDUAL DATA ITEMS OF A LOW-VOLTAGE SWITCH

(75) Inventors: Thomas Driehorn, Berlin (DE); Andreas Pancke, Berlin (DE)

(73) Assignee: Siemens Aktiengesekkschaft, Munich (DE)

( * ) Notice: Subject to any disclaimer, the term of this patent is extended or adjusted under 35 U.S.C. 154(b) by 739 days.

(21) Appl. No.: 11/887,417

(22) PCT Filed: Mar. 28, 2006

(86) PCT No.: PCT/EP2006/061086

§ 371 (c)(1), (2), (4) Date: Sep. 28, 2007

(87) PCT Pub. No.: WO2006/103226

PCT Pub. Date: Oct. 5, 2006

(65) Prior Publication Data

US 2009/0271559 A1 Oct. 29, 2009

(30) Foreign Application Priority Data

Mar. 31, 2005 (DE) ........................ 10 2005 015 498

(51) Int. Cl.
G06F 12/00 (2006.01)
G06F 13/00 (2006.01)
G06F 13/28 (2006.01)
H02H 3/08 (2006.01)
H02H 9/02 (2006.01)

(52) U.S. Cl. ...................................... 711/103; 361/93.3
(58) Field of Classification Search .................. 711/103; 361/93.3
See application file for complete search history.

(56) References Cited

U.S. PATENT DOCUMENTS

| 4,958,252 | A | | 9/1990 | Murphy et al. |
| 5,943,201 | A | * | 8/1999 | Walker et al. .................. 361/64 |
| 6,639,775 | B1 | | 10/2003 | Musiol et al. |
| 6,809,913 | B2 | * | 10/2004 | Hochgraef et al. ......... 361/93.3 |
| 6,836,396 | B1 | * | 12/2004 | Tignor et al. ............... 361/93.3 |
| 7,133,270 | B2 | | 11/2006 | Driehorn et al. |
| 2001/0000355 | A1 | * | 4/2001 | Santos et al. .................. 702/58 |
| 2002/0194423 | A1 | | 12/2002 | Ogawa |
| 2003/0048589 | A1 | * | 3/2003 | Tignor et al. ............... 361/93.3 |
| 2004/0148481 | A1 | | 7/2004 | Gupta |

FOREIGN PATENT DOCUMENTS

DE 69110695 T2 11/1995

(Continued)

OTHER PUBLICATIONS

International Search Report dated Jun. 9, 2006.

(Continued)

*Primary Examiner*—Kevin L Ellis
*Assistant Examiner*—Ryan Bertram
(74) *Attorney, Agent, or Firm*—Harness, Dickey & Pierce, P.L.C.

(57) ABSTRACT

A method is disclosed for storing individual data items of a low-voltage switch provided with a microcontroller triggering unit. According to an embodiment, the ROM cells of a dead microcontroller ROM which are not occupied by a program code memory cells are occupied by the individual data items of the low-voltage switch.

12 Claims, 2 Drawing Sheets

FOREIGN PATENT DOCUMENTS

| | | |
|---|---|---|
| DE | 19845799 A1 | 4/2000 |
| DE | 10019092 A1 | 10/2001 |
| DE | 10221571 | 12/2003 |
| DE | 10221571 A1 | 12/2003 |
| DE | 10221572 A1 | 12/2003 |
| DE | 10221579 A1 | 12/2003 |
| EP | 0 880 159 A2 | 11/1998 |
| EP | 0880159 | 11/1998 |
| EP | 1 511 147 | 3/2005 |
| EP | 1511147 | 3/2005 |

OTHER PUBLICATIONS

German Search Report dated Apr. 21, 2005.

* cited by examiner

METHOD FOR STORING INDIVIDUAL DATA ITEMS OF A LOW-VOLTAGE SWITCH

PRIORITY STATEMENT

This application is the national phase under 35 U.S.C. §371 of PCT International Application No. PCT/EP2006/061086 which has an International filing date of Mar. 28, 2006, which designated the United States of America and which claims priority on German Patent Application number DE 10 2005 015 498.0 filed Mar. 31, 2005, the entire contents of which are hereby incorporated herein by reference.

FIELD

At least one embodiment of the invention generally relates to a method for storage of individual data items of a low-voltage circuit breaker with a microcontroller tripping device.

BACKGROUND

Modern low-voltage circuit breakers are equipped with an electronic tripping device, and contain a programmable microcontroller. The tripping device can be used for a plurality of low-voltage circuit breakers with different ratings, and can be matched to the respective circuit breaker type. For this purpose, the tripping device requires type data as well as other individual data items about the circuit breaker, that is to say calibration data describing specific hardware data, calibration data for analog measurement inputs of the microcontroller, as well as the serial number and identification number of the circuit breaker, by means of which each individual breaker can be identified. This data should be stored as safely and invariably as possible.

One normal solution is for this data to be stored in a rewritable information memory, for example flash-EEPROM, or a serial EEPROM, and to be read by the software as required. The linking process between them often involves slow serial data buses such as I²C or SPI. This reading process has a negative influence on the time taken for complete activation.

DE 198 45 799 A1 discloses the information memory being integrated in the plug-in apparatus of a connecting line between a current transformer and an overcurrent release.

Since this requires a special plug, DE 100 19 092 A1 has proposed for an EEPROM to be inserted directly in the connecting line. Since the connecting line is subject to the interference influence of electrical fields in the circuit breaker, DE 102 21 572 A1 has proposed that the information memory be accommodated physically separately from the overcurrent release in the circuit breaker, and that it be operated by means of a write protection system. The write protection can be activated either via the overcurrent release and a data bus, or via a special programmer (DE 102 21 579 A1). According to DE 102 21 571 A1, activation and deactivation are possible by varying the supply voltage, for example changing the polarity of the supply voltage to the information memory.

The information memory with a write protection system has the disadvantage that the writing/reading cycle can be influenced by electromagnetic interference fields, and that data losses can occur in the event of an inadvertent change from the read mode to the write mode.

SUMMARY

At least one embodiment of the invention is based on specifying a method for storage of individual data items of a low-voltage circuit breaker, by which the data is quickly available and is reliably protected against unauthorized access and data losses.

Accordingly, ROM memory cells which are not filled with program code in the ROM of the microcontroller are filled with the individual data items (calibration data, identification data) of the low-voltage circuit breaker.

The free memory cells in the ROM are expediently filled with the individual data items of the circuit breaker in a further programming cycle after the programming of the program code in the ROM of the microcontroller.

The further programming cycle is carried out by making use of the physical characteristics of the memory cells that each bit cell can be reprogrammed from the initial value "1" to "0", but cannot be reset to the original state. Memory cells which are not programmed in the first run can therefore still be written to in a second or further run.

If required, a plurality of areas of the OTP-ROM can be defined for subsequent programming cycles, so that the data can also be updated, with the respective up-to-date data being accessed.

The advantage of the method is that
no additional memory module is required for the calibration data,
from the software point of view, the data is directly available and can be used without any time loss; it need not be read from the external memory via slow data buses before it can be used,
the data is better protected against unauthorized access. External reading or modification of the data is feasible only with a very high degree of technical effort, if it is not completely impossible, depending on the microcontroller.

BRIEF DESCRIPTION OF THE DRAWINGS

The method will be explained in more detail with reference to an example embodiment and, in the associated drawings.

DETAILED DESCRIPTION OF THE EXAMPLE EMBODIMENTS

The OTP-ROM first of all has a program code written to it in a first programming cycle, containing the functions of the overcurrent release. The individual memory cells in the OTP-ROM can be written to only once (one-time programmable). In accordance with the method according to an embodiment of the invention, even in this first programming cycle, data items, for example identification data for the circuit breaker, can also be entered in memory cells which have not been filled by the program code, although this is expediently done in a further programming cycle.

Correct interaction of the overcurrent release with the current transformers in a power supply system that is being monitored requires, for example, that the microcontroller for the overcurrent release processes the current signals supplied to it using conversion factors, depending on the rated current and the accuracy of the current transformer, the nature of the circuit breaker and further factors. These conversion factors can be determined by a test run of the circuit breaker, for which purpose the program code (firmware) must, however, also be operable. The conversion factors determined in the test run form calibration data, which must be stored in an information memory of the circuit breaker. An unfilled area of the memory cell in the OTP-ROM is used for this purpose, according to an embodiment of the invention.

Figure 1:
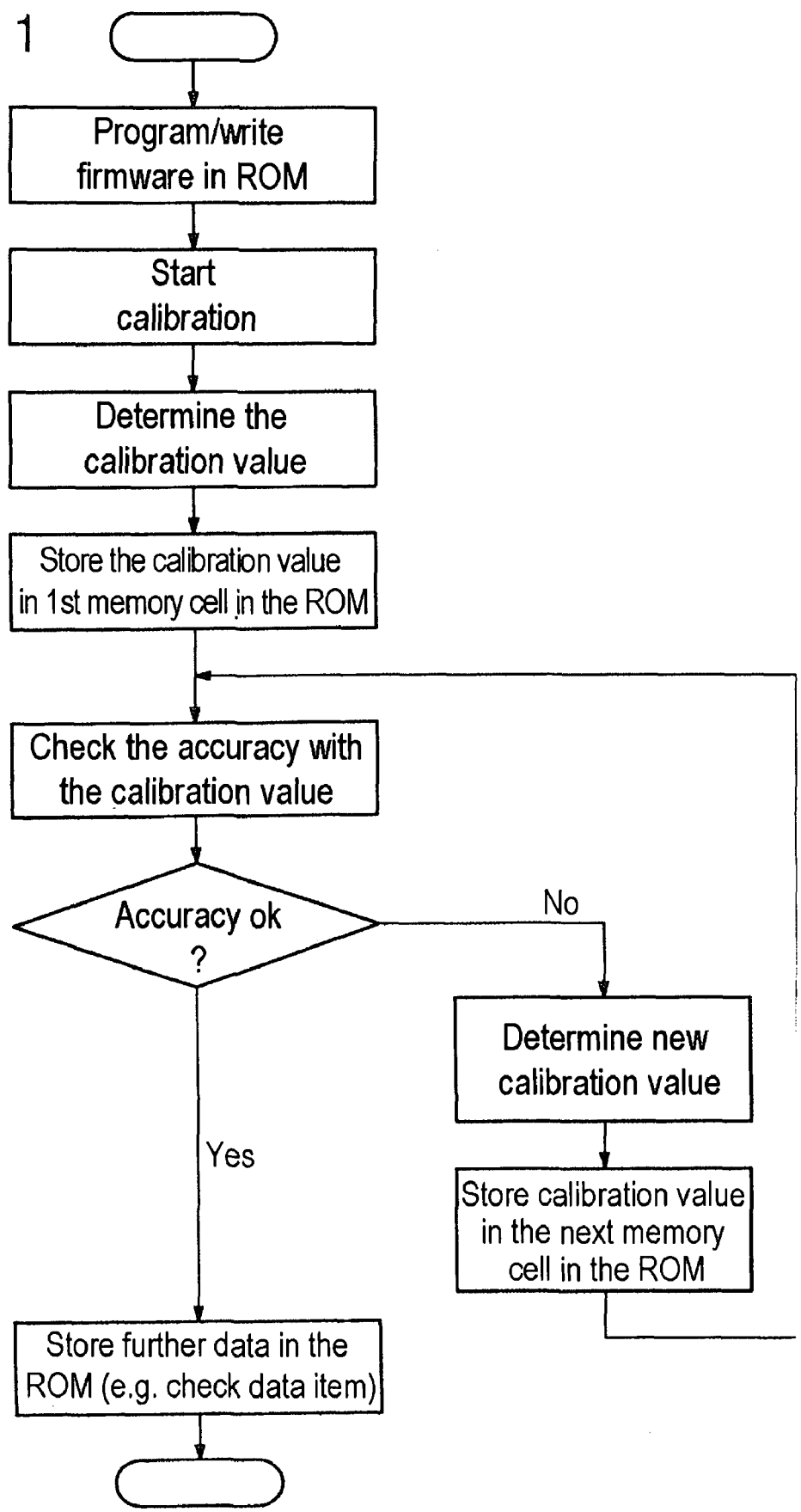
FIG. 1 shows a flowchart for storage of a calibration value.

FIG. 1 shows the process of determining and storing a single calibration value. The determined calibration value is read in a second programming cycle into the first free memory cells in the OTP-ROM. At the same time, identification data can also be read in as well here. The calibration value is then checked once again and, if necessary, is entered as a corrected value in the next free memory cell. The process can be repeated until an appropriate calibration value is available.

Figure 2:
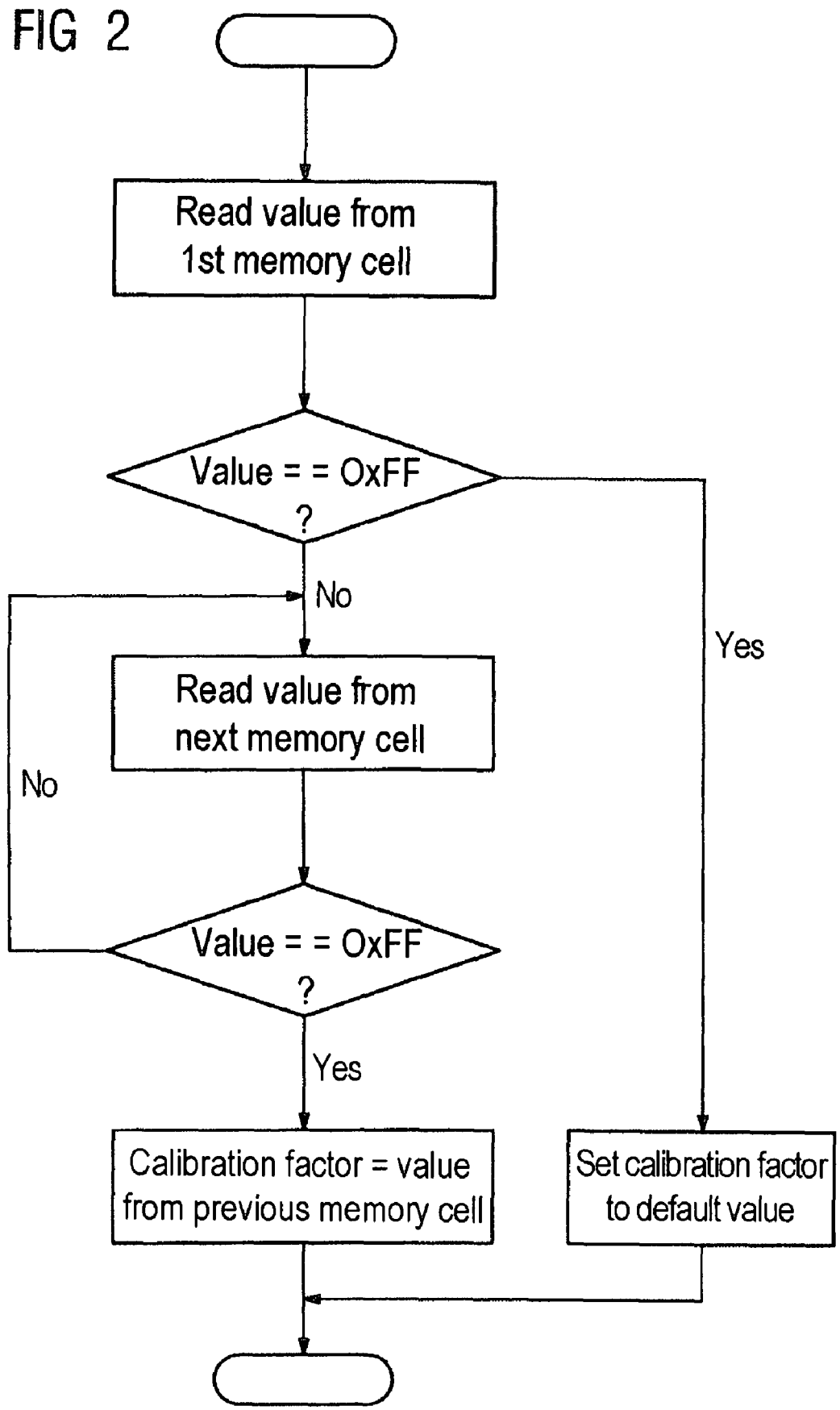
FIG. 2 shows a flowchart for reading of a calibration value.

When reading calibration values, the program then accesses the respectively most recent of the stored calibration values, as shown in a further flowchart in FIG. 2. If the program finds an unoccupied memory cell, that is to say a memory cell that has not been changed (no "F"), then it reads the previous memory cell, which contains the appropriate calibration value.

If required, one or else a plurality of memory areas can be defined in the OTP-ROM for subsequent programming cycles, to which up-to-date data can be read again later, or identification data is entered for the first time which, for example, can be defined only before delivery of the circuit breaker. Even in the case of a circuit breaker which is already in use, it may be necessary to update the individual data items. By way of example, replacement of current transformers may result in the need to change the data items.

During operation of a embodiment, the microcontroller accesses the stored data, that is to say it processes the current signal supplied from the current transformers together with the stored data items and decides to carry out tripping without any delay in the event of short-circuit currents, delayed tripping in the event of overcurrents, and the production of appropriate messages. The program code must be programmed such that it always accesses the respective up-to-date data.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A method for storage of calibration data as individual data items of a low-voltage circuit breaker with a microcontroller tripping device, comprising:
    filling memory cells of a one-time programmable memory of the microcontroller with a program code written to it in a programming cycle;
    executing a test run of the program code;
    determining calibration data of the tripping device in the test run;
    filling memory cells of the memory, which are not filled with the program code, with the calibration data in a first further programming cycle; and
    reading the most recent of the stored calibration data when running the program code to operate the tripping device.

2. The method as claimed in claim 1, further comprising:
    repeated running of the program code to determine at least one of corrected calibration data and corrected individual data and filling memory cells of the memory, which are not filled with the corrected calibration data/individual data in a second further programming cycle.

3. The method as claimed in claim 1, wherein a plurality of areas of the memory are defined for subsequent programming cycles for filling with individual data items of the low-voltage circuit breaker.

4. The method of claim 1, wherein the memory is a read only memory (ROM).

5. The method as claimed in claim 4, wherein the memory cells are filled with individual data items in a further programming cycle, after programming the memory with the program code.

6. The method as claimed in claim 1, wherein the program code is program code for an overcurrent release of the low-voltage circuit breaker.

7. The method as claimed in claim 5, wherein the program code is program code for an overcurrent release of the low-voltage circuit breaker.

8. The method as claimed in claim 2, wherein a plurality of areas of the memory are defined for subsequent programming cycles for filling with individual data items of the low-voltage circuit breaker.

9. The method as claimed in claim 4, wherein a plurality of areas of the memory are defined for subsequent programming cycles for filling with individual data items of the low-voltage circuit breaker.

10. The method as claimed in claim 5, wherein a plurality of areas of the memory are defined for subsequent programming cycles for filling with the individual data items of the low-voltage circuit breaker.

11. The method as claimed in claim 6, wherein a plurality of areas of the memory are defined for subsequent programming cycles for filling with individual data items of the low-voltage circuit breaker.

12. The method as claimed in claim 7, wherein a plurality of areas of the memory are defined for subsequent programming cycles for filling with the individual data items of the low-voltage circuit breaker.

* * * * *